Feb. 11, 1936.  W. A. KRANER  2,030,515
METHOD OF MANUFACTURING NONCORROSIVE ARMORED METAL PIPE
Filed Jan. 4, 1933
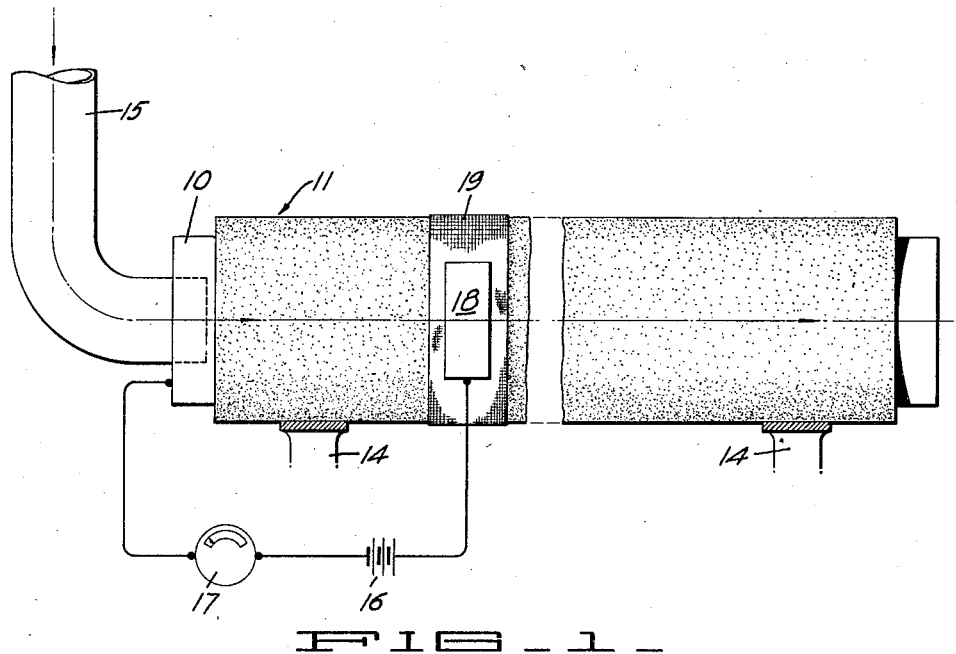
FIG_1_
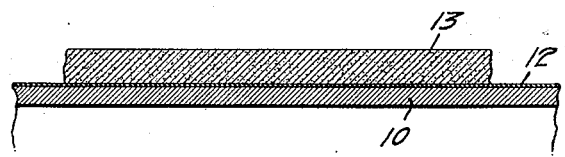
FIG_2_
INVENTOR.
Warren A. Kraner
BY
White, Prost, Flehr & Lothrop
ATTORNEYS.

Patented Feb. 11, 1936

2,030,515

UNITED STATES PATENT OFFICE 2,030,515

METHOD OF MANUFACTURING NONCORROSIVE ARMORED METAL PIPE

Warren A. Kraner, San Francisco, Calif., assignor to Cement Wrapped Pipe Company, Ltd., San Francisco, Calif., a corporation of Arizona Application January 4, 1933, Serial No. 650,068

4 Claims. (Cl. 91—70)

This invention relates generally to methods for the manufacture of coated or armored metal pipe, particularly where it is desired to secure a protective coating which is relatively resistant to corrosion by chemicals or electrolysis.

It is an object of the invention to provide a method of the above character which will be relatively simple and cheap to apply commercially, and which will result in a coating having relatively high dielectric strength.

A further object of the invention is to provide a method of manufacture of the above character which will be particularly applicable when the main body of the coating consists of a material plastic in form when applied, but which subsequently sets to form a substantially rigid armor.

Further objects of the invention will appear from the following description in which the preferred embodiment of the invention has been set forth in detail in conjunction with the accompanying drawing.

Referring to the drawing:

Figure 1 is a diagrammatic view, illustrating the manner in which my method is carried out in practice.

Figure 2 is a cross sectional detail, illustrating a typical form of composite coating such as is produced by my method.

In carrying out my method I utilize at least two distinct coating materials to form a composite coating on the pipe, and after these materials are applied, the pipe undergoes a special treatment which causes the coating to attain a relatively high dielectric strength. The one coating material should be electrically insulating in character, and should be of such a character that it tends to soften and flow when heated. This coating material is applied directly upon the surface of the pipe, and is protected by the second or subsequent coating materials. The second or outer coating material serves as a protective armor and should have sufficient mechanical strength to suit the conditions under which the pipe or conduit is to be used.

In practice my method is carried out as follows: Assuming that the composite coating is to be applied to the exterior of the pipe, a "prime coat" of suitable material, such as asphaltum or coal tar together with volatile solvents, is first applied by brush, spraying, or dipping, to the outer pipe surface. Following application of this prime coat, the pipe is then dipped in a bath of asphaltum, or like material. Since asphaltum or like coating materials are substantially solid at ordinary temperatures, during this coating operation the asphaltum should be at a sufficiently elevated temperature to be fairly free flowing. This operation provides the exterior of the pipe with a layer or covering of bitumen material, which soon cools and sets. The prime coat becomes a composite part of the thicker asphaltum coating and tends to secure better cohesion to the pipe, although it may be omitted if desired.

Following the operation described above, a further layer of material is applied, preferably in plastic form and directly upon top of the covering of asphaltum. This second material, while plastic in form when applied, should be of such a character that it will subsequently set, to form a relatively hard, durable armor of considerable mechanical strength. For this second coating I have used with good results hydraulic concrete mortar containing Portland cement, and have also utilized various mastics containing bitumens in addition to Portland cement.

In this connection a metallic reinforcement may be applied if desired, and likewise a strip of cloth can be applied upon top of the layer of plastic material, to retain this material in intimate contact with the underlying covering of asphaltic material, and under a certain amount of pressure.

After applying the second layer of plastic material upon top of the inner covering or surfacing, as explained above, and preferably after the plastic material has set, the composite coating thus produced is subjected to a further treatment, which can best be explained by reference to the accompanying drawing.

Referring to Fig. 1, I have shown a steel pipe 10, to which the composite coating 11 has been applied. Referring to Fig. 2, this coating is formed of the inner covering or surfacing 12, of asphaltum, and an outer layer 13 of hydraulic mortar. As has been previously explained, in the method of application of the layer 13, the material within this layer may be under pressure. Referring again to Fig. 1, the pipe is shown resting upon suitable supports 14, and entering one end of the pipe there is a fluid conduit 15. In order to secure an index of the electrical resistance of the completed coating, I have shown an electrical circuit including a source of current 16, and an electrical current measuring instrument such as a milliammeter 17. One terminal of this circuit is connected to the metal pipe 10, and the other terminal to an electrode 18. Electrode 18 is shown in electrical contact with the outer surface of layer 13, through a cloth wrapping 19 which may be saturated with water.

Assuming that the outer layer 13 is wet and that the pipe has not received its special treatment following application of the outer layer 13, it will be found upon test that considerable current flow will occur thru the composite coating, as indicated by the instrument 17. In other words the dielectric strength of the composite coating at this time is relatively low. In order to increase the electrical insulating value of the composite coating, I now introduce a heated fluid such as hot air, through conduit 15, in such a manner as to cause the heated fluid to pass thru the pipe. If the instrument 17 is now observed it will be found that as the pipe becomes heated, the resistance of the composite coating immediately increases. The increase in resistance is very marked, and continues until the conduction of current thru the coating is comparatively negligible. The coating will now have attained a relatively high dielectric value, and it has been found that it will retain this high dielectric value over a long period of time.

What actually happens when the dielectric strength of the composite coating is increased by heating of the pipe, may not be thoroughly understood. However it has been observed that the asphaltum 12, at the time the subsequent layer 13 is applied, contains small cracks and cavities, which can be penetrated by moisture in the outer layer 13. If the pipe is put into service without special treatment in accordance with the present method, moisture will penetrate the outer covering material and come into contact with the outer surface of the metal pipe thru these cracks and cavities. Thus the asphaltum covering does not effectively serve as an electrical insulation and severe corrosion by earth chemicals and electrolysis may take place. However when the pipe is heated following application of a composite coating, the asphaltum layer 12 tends to flow, to close all cracks and crevices, thus forming an unbroken membrane which is impervious to water, and which has high dielectric strength. This tendency to flow is augmented by pressure from the outer layer 13, at the time the coating is applied. Thus the production of a composite coating having relatively high dielectric strength, is made possible in a simple and effective manner.

It is probably not essential that the heating of the pipe to increase the dielectric strength of the composite coating be carried out while the outer layer 13 is wet. However a wet layer is desirable because when the heating is carried out under such conditions, it is possible to provide an indication as explained in connection with Fig. 1 so that an operator can determine when the resistance to current flow has been increased to the value desired, and can also determine the amount of heating and the heat period required to secure the desired results.

It is apparent that the material forming layer 12 can be applied in various ways other than by dipping. For example this material can be applied cold in solution with volatile solvents, and permitted to dry or by the use of brushes or wipers while the material is hot. It is also possible to employ various bitumens or bitumen products in place of asphaltum, such as products containing coal tar or petroleum pitches.

I claim:

1. In a method of the character described for the manufacture of coated metal pipe, applying a covering of bitumen pitch to one surface of the pipe, applying a wet mix of hydraulic concrete mortar on top of said covering, and then increasing the dielectric strength of the composite coating by heating the metal pipe to a temperature sufficient to cause flow of the bitumen pitch without decomposition of the same.

2. In a method of the character described for the manufacture of coated metal pipe, applying a covering of asphalt pitch to one surface of the pipe, said material tending to flow when heated, applying a wet mix of hydraulic concrete mortar on top of said covering, and then increasing the dielectric strength of the composite coating by heating the metal pipe to a temperature sufficient to cause flow of the bitumen material without decomposition of the same.

3. In a method of the character described for the manufacture of coated metal pipe, applying a covering of bitumen pitch to one surface of the pipe, said material tending to flow when heated, applying a layer of hydraulic concrete mortar on top of said covering, and then increasing the dielectric strength of the composite coating by passing a hot fluid through the pipe to heat the same, the temperature to which the pipe is heated being sufficient to cause flow of the bitumen material without decomposition of the same.

4. In a method of the character described for the manufacture of coated metal pipe, applying a bitumen pitch covering to the outer surface of the pipe, applying a wet mix of hydraulic concrete mortar on top of said bitumen covering, and then increasing the dielectric strength of the composite coating by passing a hot fluid through the pipe to heat the same, the temperature to which the pipe is heated being sufficient to cause flow of the bitumen pitch without decomposition of the same.

WARREN A. KRANER.